R. E. FINLEY.
CHICKEN ROOST.
APPLICATION FILED JAN. 7, 1911.
1,019,144. Patented Mar. 5, 1912.
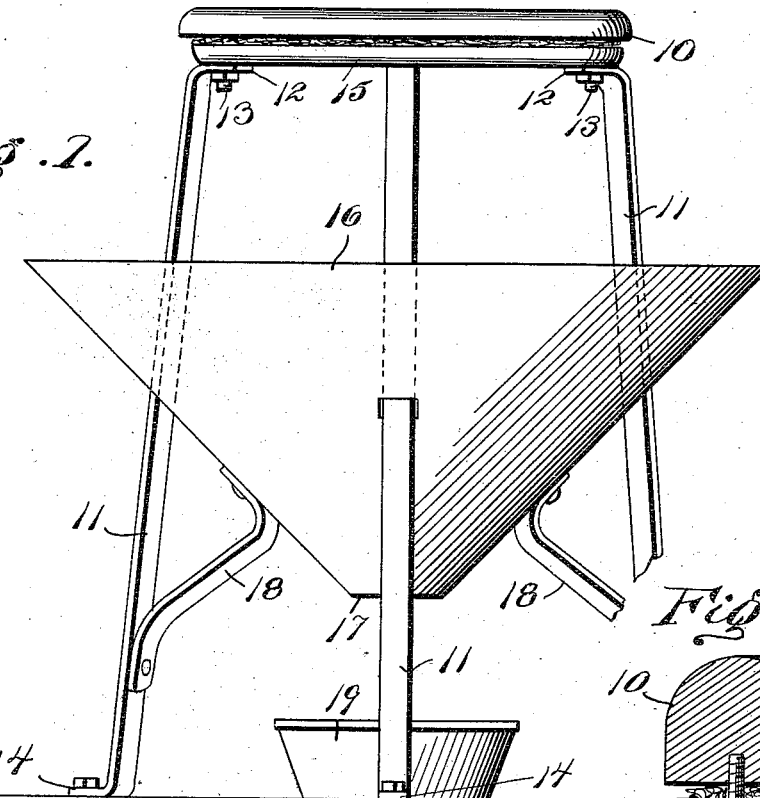
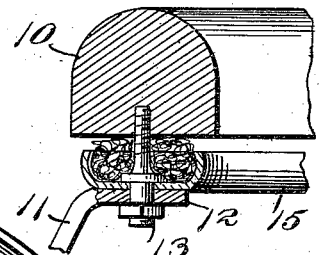
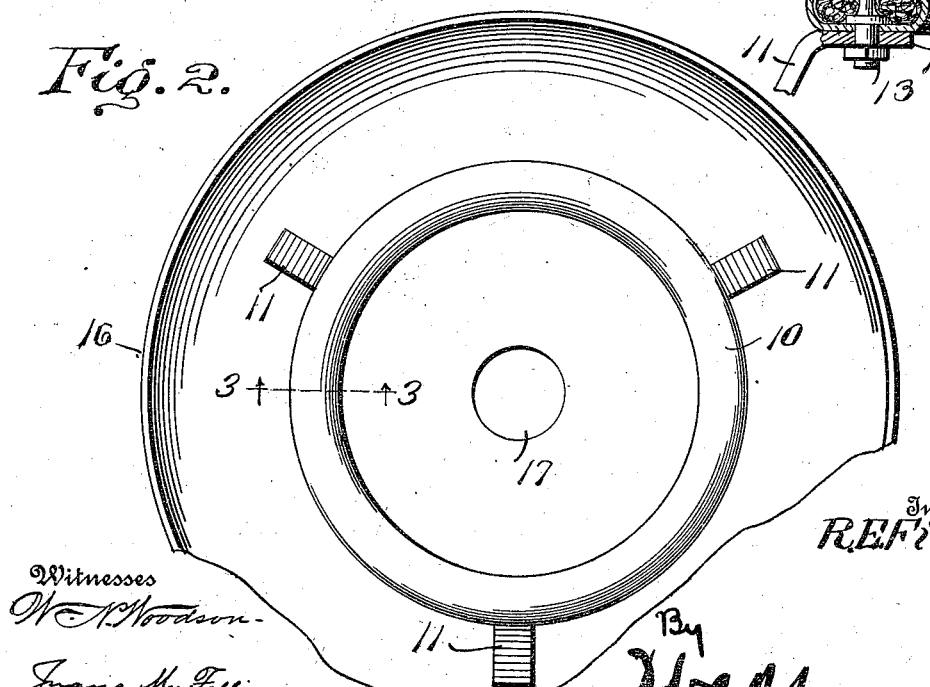

UNITED STATES PATENT OFFICE.

ROBERT E. FINLEY, OF CHAMBLEE, GEORGIA.

CHICKEN-ROOST.

1,019,144. Specification of Letters Patent. Patented Mar. 5, 1912.

Application filed January 7, 1911. Serial No. 601,350.

*To all whom it may concern:*

Be it known that I, ROBERT E. FINLEY, citizen of the United States, residing at Chamblee, in the county of Dekalb and State of Georgia, have invented certain new and useful Improvements in Chicken-Roosts, of which the following is a specification.

This invention relates to improvements in chicken roosts, designed more particularly to protect the chickens from lice, mites and other insects, and also to enable the roosts to be readily cleansed and maintained in a sanitary condition.

Another object of the invention is to provide a device of this character wherein disinfecting material may be employed in position to protect the fowls without danger of injury thereto.

With these and other objects in view, the invention consists in certain novel features of construction as hereinafter shown and described and then specifically pointed out in the claim, and in the drawings illustrative of the preferred embodiment of the invention.

Figure 1 is a side elevation of the improved device; Fig. 2 is a partial plan view of the same. Fig. 3 is an enlarged section on the line 3—3 of Fig. 2.

Corresponding and like parts are referred to in the following description and indicated in all the views of the drawings by the same reference characters.

The improved device may be of any required size, or of any suitable material, but the "roost" portion will preferably be circular, as shown. The improved device comprises the perch portion which is preferably of wood and also preferably circular and represented conventionally at 10. The member 10 is supported at a suitable distance above the ground or other support by a framework comprising standards 11 directed inwardly at their upper ends as shown at 12 and provided with threaded studs 13 to engage in the member 10. At their lower ends the standards 11 are outturned as shown at 14 to form supporting feet for the frame. Any required number of the standards 11 may be employed but generally three will be used, as shown.

Bearing upon the inturned upper ends 12 of the standards, is an annular shallow receptacle 15 in which suitable disinfectant is located, the receptacle being preferably less in width than the perch 10 so that the latter overhangs the receptacle. By this means no danger exists of the feet of the fowls coming in contact with the receptacle or its contents.

Any suitable disinfectant may be employed, but generally absorbent material, such as cotton or the like, will be inserted in the receptacle 15 to receive the disinfectant.

Supported upon the standards 11 and spaced below the receptacle 15, is a larger, preferably conical receiver 16 into which the droppings fall, the receiver 16 being open at the lower end as shown at 17. The receiver 16 is connected in any suitable manner to the standards 11 and will preferably be provided with suitable braces 18.

A suitable receiver 19 is located below the receiver 16, as shown, the latter being thus readily removable when required. The studs 13 being readily detachable, the perch 10 and other parts may be disconnected for cleansing or replacing when broken or repaired. All of the parts except the perch 10 are of metal so they can be thoroughly cleansed and thus maintained in a sanitary condition.

It will be noted that the receiver 16 is located upon the perch support, of which the standards 11 are components, between the said perch and the base of the support and the said receiver is spaced from the perch and from the base of the support. This receiver is in inclined position with relation to the standards 11 and its outer edge portion projects considerably beyond the outer sides of the support and also beyond the peripheral portion of the perch 10. Consequently the receiver serves a double purpose, namely, means for directing the droppings from the fowls to a receptacle or receiver 19, and the said receiver serves as a fender for preventing rats, minks or other small animals from climbing the standards and getting at the fowls while they are roosting upon the perch. Thus it will be seen that in the present roost means is provided for protecting the fowls against parasites and the inroads of small animals of prey.

Having thus described the invention, what is claimed as new is:

A roost comprising a support, a continuous perch located thereon, a continuous receiver located upon the support below the perch and above the lower end of the support and inclined with relation to the support and spaced from the perch and the base of the support, the outer edge portion of the receiver projecting outwardly beyond the outer sides of the support and the outer edge portion of the perch.

In testimony whereof, I affix my signature in presence of two witnesses.

ROBERT E. FINLEY. [L. S.]

Witnesses:
C. P. WARNASK,
W. B. METCALF.

Copies of this patent may be obtained for five cents each, by addressing the "Commissioner of Patents, Washington, D. C."